United States Patent [19]

Nakamura et al.

[11] Patent Number: 4,795,958
[45] Date of Patent: Jan. 3, 1989

[54] SERVOMECHANISM FOR RECORDING DISK REPRODUCING SYSTEM

[75] Inventors: Hiroshi Nakamura; Satoshi Kusano, both of Saitama, Japan

[73] Assignee: Pioneer Electronic Corporation, Tokyo, Japan

[21] Appl. No.: 98,823

[22] Filed: Sep. 21, 1987

[30] Foreign Application Priority Data

Sep. 20, 1986 [JP] Japan .................. 61-222734
Sep. 20, 1986 [JP] Japan .................. 61-222735
Sep. 20, 1986 [JP] Japan .................. 61-222736
Sep. 20, 1986 [JP] Japan .................. 61-222737

[51] Int. Cl.[4] .................................. G05B 5/00
[52] U.S. Cl. ............................ 318/625; 369/45; 369/46; 369/47; 360/69
[58] Field of Search .............. 318/625; 369/45–47; 360/69

[56] References Cited

U.S. PATENT DOCUMENTS 4,536,806  8/1985  Louth ........................... 360/69
4,611,319  9/1986  Naito ............................ 369/47

Primary Examiner—William M. Shoop, Jr.
Assistant Examiner—Saul M. Bergmann
Attorney, Agent, or Firm—Sughrue, Mion, Zinn, Macpeak, and Seas

[57] ABSTRACT

A servomechanism for a recording disk reproducing system which includes a switching device receptive of the analog error signals of a variety of servo systems for outputting the same analog error signals sequentially in a time division manner in response to sampling signals of predetermined frequency. The analog error signals passed through the switching means are converted into digital error signals and subjected to arithmetic processing. The processed digital error signals are reconverted into analog error signals and distributed to the respective controlled portions of the various servo systems in synchronism with the sampling signals. The frequency of the sampling signals is set on the basis of that of a reference signal contained in the signal read from the disk being played.

4 Claims, 5 Drawing Sheets

SERVOMECHANISM FOR RECORDING DISK REPRODUCING SYSTEM

BACKGROUND OF THE INVENTION

The present invention relates to a servomechanism for a reproducing system for a digitally recorded disk.

In a reproducing system for optically reproducing recorded information on a digitally recorded disk such as a digital audio disk or a video disk, the rotational drive of the disk is controlled by a spindle servomechanism, and the recorded information is read out by means of a pickup positionally controlled in the radial direction by a slider servomechanism.

Such a disk reproducing system also uses other servomechanisms, such as a focusing servomechanism for controlling the information detecting optical spot generated by the pickup so as to be correctly focused on the recording surface of the disk, a tracking servomechanism for controlling the optical spot so as to track accurately the recording track on the disk, namely, a helical recording track, and a time-axis servomechanism for correcting for time-axis (time-based) fluctuations in the reproduced signal. These focusing, tracking and time-axis servomechanisms are classified as "fine tuning" servo systems, whereas the aforementioned spindle and slider servomechanisms are classified as "rough tuning" servo systems.

In a system equipped with these various servomechanisms according to the prior art, signal processing, such as equalization of an error signal obtained in each servo system, is performed by a separate signal processor in each servo system. Hence, a large number of circuit elements is required, making the system complex and costly.

SUMMARY OF THE INVENTION

The present invention has been conceived to eliminate the above-specified defects of the prior art. An object of the invention is thus to provide a servomechanism for a disk reproducing system which can share a signal processor so as to simplify the overall circuit structure and reduce production costs by processing the individual error signals digitally in a time-division manner.

The servomechanism according to the present invention is constructed by inputting individual analog error signals from a variety of servomechanisms and subjecting the analog error signals to time division in synchronism with a sampling signal of a predetermined frequency, converting the corresponding analog error signals outputted sequentially into digital error signals and reconverting the digital error signals into analog error signals after predetermined processing, and distributing the reconverted analog error signals to the individual controlled portions of the various servomechanisms in synchronism with the sampling signal, wherein the frequency of the sampling signal is set on the basis of the frequency of a reference signal contained in a signal read out from the disk being played.

According to the present invention, moreover in servomechanism including at least a focusing servo system, a focusing error signal is digitally processed with priority during the focusing operation of the focusing servo system, that is, until the focusing servo system is locked in.

Further, a servomechanism including at least a tracking servo system and a focusing servo system is characterized in that the sampling period of the tracking error signal is set shorter than that of the focusing error signal.

In a recording disk reproducing system including a variety of servo systems divided into at least two groups, a servomechanism according to another feature of the present invention is constructed by inputting the individual analog error signals of a variety of servo systems and outputting them sequentially as digital error signals in a time division manner, subjecting the digital error signals to predetermined processing for each servo system and converting the processed error signals nto analog error signals, and feeding the analog error signals to the respective controlled portions of the servo system, wherein the digital error signal of a servo system having a higher priority is processed with priority when it is inputted.

DESCRIPTION OF THE PREFERRED EMBODIMENTS

Figure 1A:
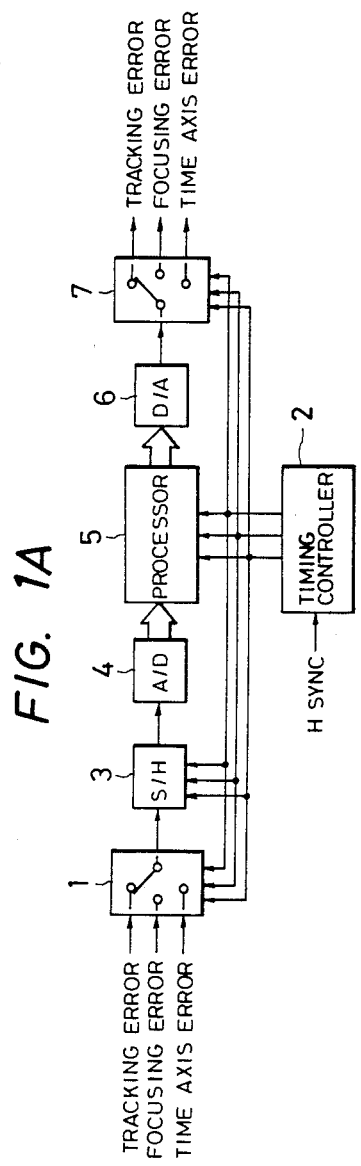
FIG. 1A is a block diagram showing one embodiment of the present invention.

The present invention will be described in detail below in a connection with various preferred embodiments and with reference to the accompanying drawings.

FIG. 1 is a block diagram showing a first preferred embodiment of the present invention. As shown in FIG. 1, a switching circuit 1 for outputting a plurality of inputs alternatively is supplied with the individual error signals of three types of servo systems, such as time-axis, focusing and tracking servo systems, namely, a time-axis error signal, a focusing error signal and a tracking error signal. The switching circuit 1 is composed of three analog switches corresponding to the respective servo systems.

In case the disk to be played is a video disk, the time-axis servo system uses as the time-axis error signal a signal corresponding to the phase difference of a horizontal synchronizing signal, which is separated and extracted from the RF (radio frequency) signal read from that disk, with respect to a reference horizontal synchronizing signal. As a result, the time-axis error signal is outputted upon each generation of the horizontal synchronizing signal.

The focusing error signal can be generated by a known detecting method such as the astigmatic method, the critical angle detecting method, or the knife edge method, whereas the tracking error signal can be generated by a known detecting method such as the threebeam method, the push-pull method, the heterodyne method, or the time difference detecting method.

Thus, the switching circuit 1, respective of the individual analog error signals, i.e, the time-axis, focusing and tracking error signals, outputs the analog error signals sequentially in a time division manner in synchronism with timing pulses generated by a timing controller 2. The time-axis error signal, for example, is outputted for 1H (wherein H designates a horizontal scanning period), because it is outputted for each generation of the horizontal synchronizing signal, and the focusing error signal and the tracking error signal are outputted at respectively suitable timings within that period of 1H. For example, the tracking error signal is generated twice for the period of 1H although the focusing error signal is outputted once. As a result, the individual analog error signals are outputted sequentially in the order of the time-axis error signal, the tracking error signal, the focusing error signal, the tracking error signal, the time-axis error signal, etc., in a time division manner for a period of ½H, for example, by the switching circuit 1.

These analog error signals are fed to a sample-and-hold circuit 3, and are sampled and held at the aforementioned respective timings. Specifically, the time axis error signal and the focusing error signal are sampled for the period of 1H, and the tracking error signal is sampled for a period of ½H. These sampled-and-held outputs are converted by an A/D (analog/digital) converter 4 into digital error signals, which are fed to a processor 5 implemented with a CPU (central processing unit). This processor 5 performs predetermined arithmetic operations, such as equalizing, on each of the digital error signals. The digital error signals are then reconverted by a DA (digital/analog) converter 6 into analog signals, which are then fed to a switching circuit 7. This switching circuit 7 divides the individual analog error signals fed serially at the aforementioned sampling timings and feeds them to the controlled portions of the respective individual servo systems.

The time-axis servo system includes in its driven portion a CCD (charge coupled device) or a variable delay element inserted into the signal line of the system which reproduces the read-out RF signal, the delay of which is varied in accordance with the level of the time-axis error signal. The focusing servo system has as its driven portion a focusing actuator for driving along its optical axis an objective lens forming part of the optical system of the pickup. The tracking servo system includes as its driven portion a tracking actuator which pivots the optical system of the pickup, for example.

Figure 2:
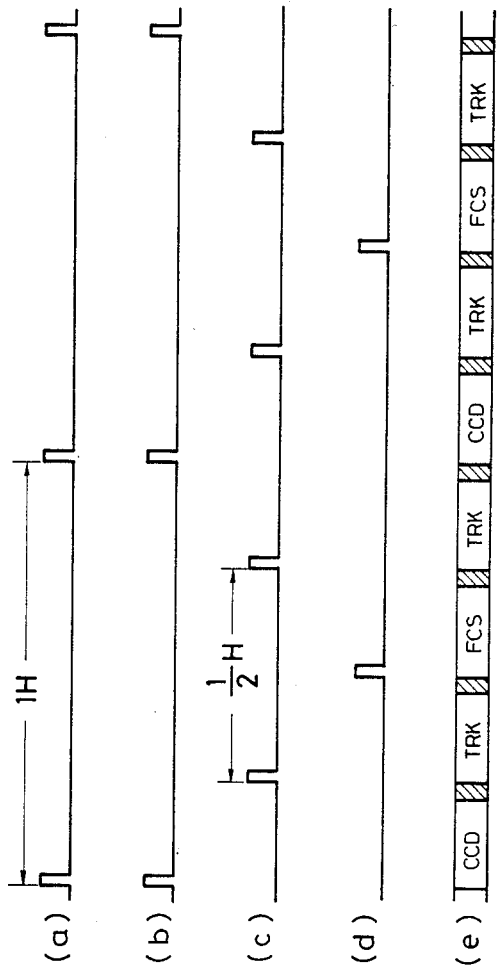
FIG. 2 is a timing chart showing the operation of the circuit of FIG. 1A.

With this structure, timing pulses of periods of 1H (b), ½H (c) and 1H (d) with a phase difference of ½H are generated for the individual servo systems by the timing controller 2, as shown in FIG. 2, in syncrhonism with the reproduced horizontal synchronizing pulses (a). In response to these timing pulses (b) to (d), the switching circuit 1 effects switching operations so as to output the individual analog error signals in a time division manner sequentially in the order of the time-axis-error signal, the tracking error signal, the focusing error signal, the tracking error signal, the time-axis error signal, etc., for example. These timedivided error signals are sampled-and-held and A/D-converted by the sample-and-hold circuit 3 in synchronism with the respective timing pulses (b) to (d). The resultant digital error signals are processed or equalized digitally in a sequential manner and are subjected to a D/A reconversion. Subsequently, the resultant analog error signals are distributed to the respective systems by the switching circuit 7 in synchronism with the aforementioned respective timing pulses (b) to (d) and to the corresponding controlled portions, i.e., the aforementioned tracking actuator, focusing actuator and CCD, respectively. Moreover, as seen in FIG. 2 at (e), the hatched portions indicate blank periods, and the remaining portions indicate the processing periods of the individual servo systems.

The sampling period of the focusing error signal is made twice as long as that of the tracking error signal. This is because the focusing servo system has a control target actuator of higher mass than that of the tracking servo system and accordingly has a poorer responsiveness and higher allowability for residual errors, and hence it can be sufficiently controlled even if the sampling period is set longer. In other words, the sampling period of the tracking error signal can be shortened by lengthening the sampling period of the focusing error signal so that the tracking accuracy can be accordingly improved.

The increase of this sampling period may preferably be two or more (integral) times, although it is not be limited to the two times. Thus, the arithmetic processing of each servo system can be accomplished by setting the sampling period at an integral number of times as large as the horizontal synchronizing pulses so that efficient use can be made of the processor 5 and other components.

In the embodiment described above, the individual error signals are processed digitally in a time division manner for the tracking, focusing and time-axis servo systems. However, similar signal processing can be accomplished for the spindle servo system, the slider servo system, etc.

An oscillator for generating reference horizontal synchronizing pulses for the generation of error signals is needed for the time-axis servo system and the spindle servo system. This oscillator can be commonly used as a reference oscillator for generating the timing pulses of the timing controller 2. As a result, the circuit structure of the timing controller 2 can be simplified.

As has been described hereinbefore, according to the present invention, the signal processing circuits from the A/D converter to the D/A converter can be used commonly in the individual servo systems by processing the respective error signals of the various servo systems digitally in a time division manner. This makes it possible to reduce the circuit scale and cost, resulting in greater circuit integration.

By setting the sampling frequency on the basis of the frequency of the reference signal contained in the signal read from the disk, moreover, the error signal can be sampled at the generation timing of the error signal in case there is included a servo system for generating the error signal on the basis of such reference signal. As a result, accurate control of each servo system is ensured, even though signal processing is performed in a time division manner.

By setting the sampling period of the tracking error signal shorter than that of the focusing error signal, furthermore, the focusing servo system can be sufficiently controlled, even if it has a poor responsiveness and a high allowability for residual errors and requires a long sampling period. This makes it possible to improve the tracking accuracy of the focusing servo system without reducing the servo accuracy thereof.

Figure 1B:
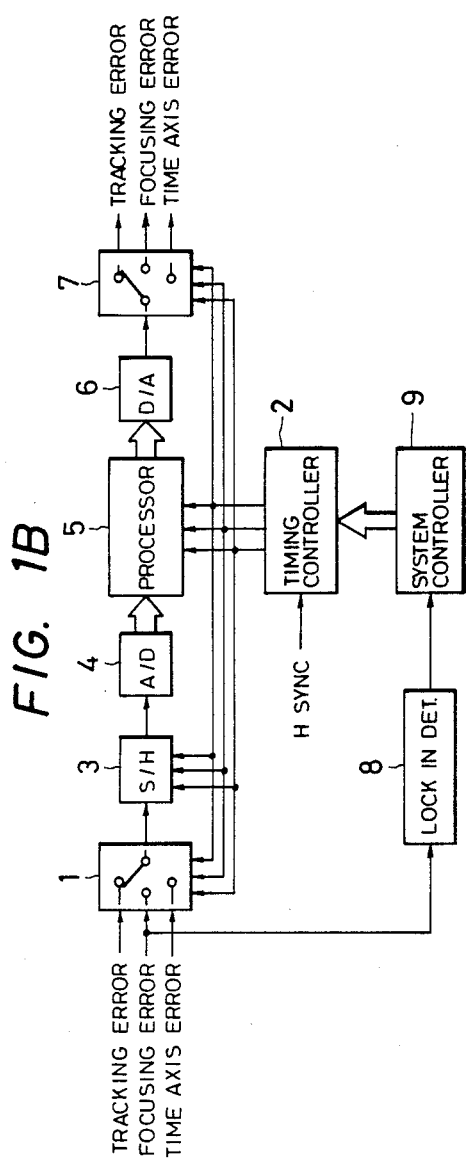
FIG. 1B is a block diagram showing another embodiment of the present invention.
Figure 3:
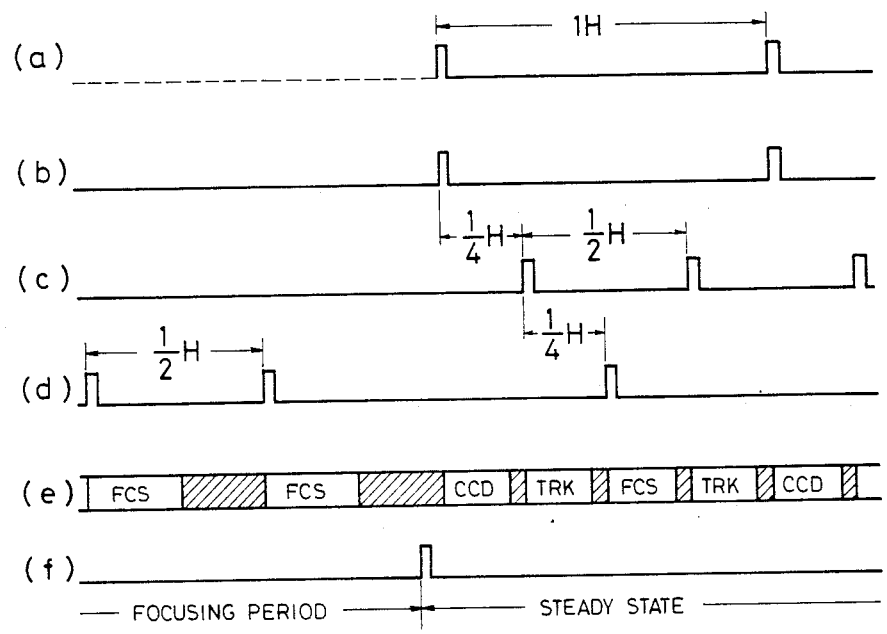
FIG. 3 is a timing chart showing the operation of the circuit of FIG. 1B.

FIG. 1B is a block diagram showing another embodiment of the present invention, and FIG. 3 is a timing chart showing the operation of the circuit of FIG. 1B. The components of FIG. 1B shared with FIG. 1A are denoted by common reference numerals, and their description will be omitted.

The embodiment shown in FIG. 1B is provided with a lock-in detector 8 for detecting the lock-in state of the focusing servo system on the basis of the focusing error signal. This lock-in detector 8 generates a lock-in detection signal and feeds it to a system controller 9 when the focusing error signal, which exhibits a so-called "S-curve" characteristic around the focusing portion, is present during the focusing period of the focusing servo system. The signal level of the lock-in detection signal is within a predetermined range around a zero level (at the focused position). The system controller 9 controls the generation interval of the timing pulses for the timing controller 2 and selects only the signal line of the focusing servo system in the switching circuits 1 and 7 until the lock-in signal is generated, namely, when the focusing servo system is focused as indicated by the rise of the system, or refocused after loss of lock.

With this structure, when the system is in steady state, timing pulses of the periods of 1H (b), ½H (c) and 1H (d) having a phase difference of ½H, for example, are generated by the timing controller 2 in synchronism with the reproduced horizontal synchronizing pulses (a) for each servo system, as shown in FIG. 3. In response to these timing pulses (b) to (d), the switching circuit 2 effects switching control to output the individual analog error signals in a time division manner sequentially in the order of the time-axis error signal, the tracking error signal, the focusing error signal, the tracking error signal, the time axis error signal, etc. These individual error signals are sampled-and-held and subjected to A/D conversions by the sample-and-hold circuit 3 in synchronism with the corresponding timing pulses. As shown in FIG. 3 at (e), the converted error signals are sequentially and digitally equalized and subjected to D/A conversion. Subsequently, the twice-converted error signals are distributed to the individual systems by the switching circuit 7 in synchronism with the corresponding individual timing pulses (b) to (d) and are distributed to the corresponding controlled portions such as the aforementioned tracking actuator and the focusing actuator. Also as shown in FIG. 3 at (e), the hatched portions indicate blank period, and the remaining portions indicate the processing periods of the individual servo system.

During the focusing period of the focusing servo during the start-up period of the system, or during a refocusing period following loss of lock of the same servo, on the other hand, none of the stable reproduced horizontal synchronizing signals is obtained and the optical system is in an unstable state until the focusing servo is locked in. It is unnecessary to operate the tracking servo and the time-axis servo during that period. During the focusing period of the focusing servo, therefore, the timing controller 2 is caused to generate timing pulses (d) of the period of ½H, for example, for the focusing servo by the control of the system controller 9 while ignoring the reproduced horizontal synchronizing pulses inputted in the unstable state. As a result, during that focusing period, the sampling frequency and the processing time of the focusing servo can be made higher and longer than those in the steady state, as shown in FIG. 3 at (e), thereby ensuring the focusing process and time division efficiency.

If the focusing servo is locked in so that lock-in pulses are generated by the lock-in detector 8, the timing controller 2 is released from the control of the system controller 9. Subsequently, the system controller 9 generates timing pulses (b) to (d) having a phase difference of ½H in synchronism with the reproduced horizontal synchronizing pulses (a) until the steady state is again reached.

Figure 5:
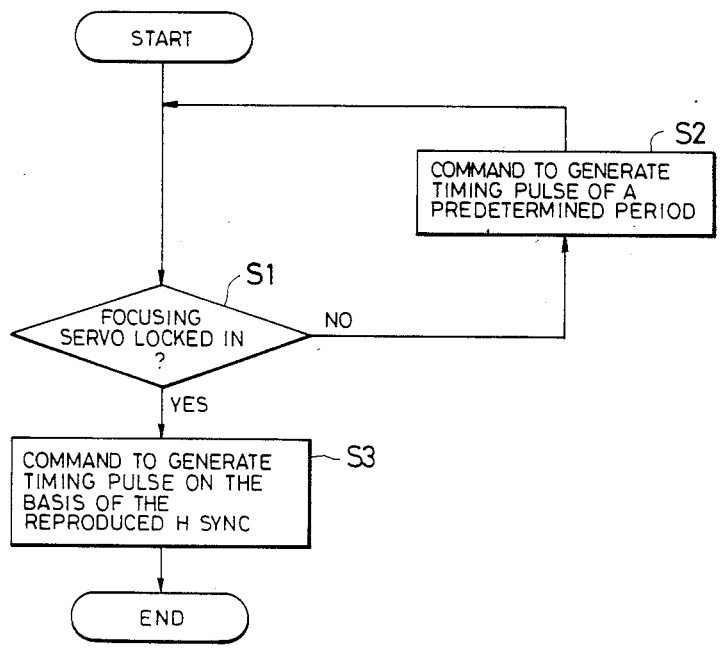
FIG. 5 is a flowchart showing the processing procedures of a system controller of FIG. 1B.

The flowchart generation of the timing pulses under the control of the system controller 9, as has been described above, is shown in FIG. 5.

When the start command of the system is issued, it is first judged (at step S1) whether or not the focusing servo has been locked in. If NO, a command is issued (at step S2) to the timing controller 2 to generate timing pulses of a predetermined period independently of the reproduced horizontal synchronizing pulses. If YES, on the other hand a command is issued (at step S3) to the timing controller 2 to generate the timing pulses on the basis of the reproduced horizontal synchronizing pulses.

In the focusing operation of the focusing servo system, according to the embodiment described above, the time and sampling frequency to be assigned to the focusing servo can be augmented by processing only the focus error signals digitally until that servo is locked in. This makes it possible to make the focusing process more reliable and enhances the time division frequency.

Still another embodiment of the present invention will be described in detail with reference to the accompanying drawings.

Figure 1C:
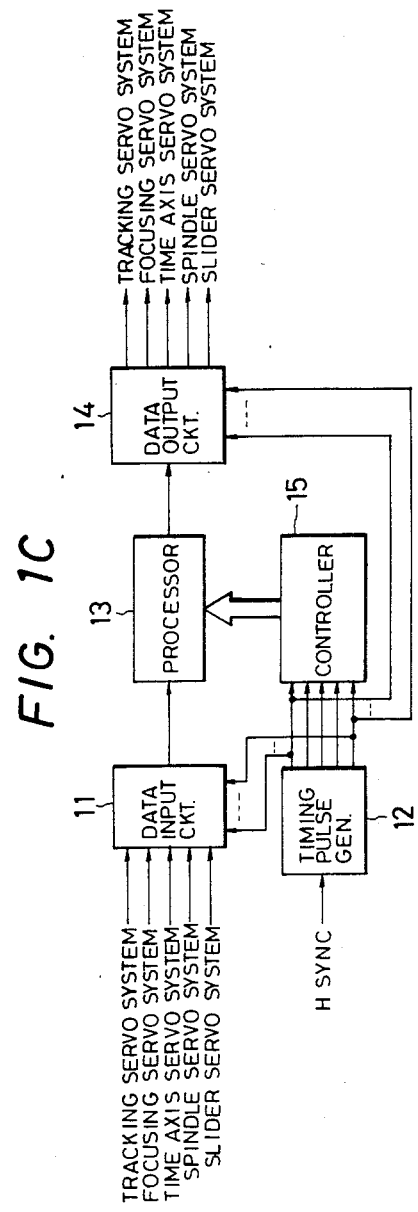
FIG. 1C is a block diagram showing still another embodiment of the present invention.

FIG. 1C is a block diagram showing a third preferred embodiment of the present invention. In FIG. 1C, a data input circuit 11 for outputting a plurality of received signals alternately of three types for the fine tuning servo systems, e.g., the time-axis servo system, the focusing servo system, and the tracking servo system, and error signals of two types for the rough tuning servo systems, e.g., the spindle servo system and the slider servo system. The data input circuit 11 receptive of those analog error signals is constructed, for example, of five analog switches provided for the fine different servo systems for outputting the individual analog error signals sequentially in a time division manner in synchronism with timing pulses generated by a timing pulse generator 12, a sample-and-hold circuit for sampling and holding the sequentially outputted analog error signals sequentially in synchronism with the aforementioned timing pulses, and an A/D converter for digitizing the outputs of the sample-and-hold circuit.

Since the error signal of the time-axis servo system is outputted upon each generation of the horizontal synchronizing signal, for example, it is outputted at the interval of 1H, and the respective error signals of the tracking servo system and the focusing servo system are outputted at suitable timings for that period of 1H. On the other hand, the tracking error signal is outputted twice for the period of 1H for each output of the focusing error signal. Hence, in the fine tuning servo systems, the individual analog error signals are outputted for the period of ½H, for example, in a time division manner from the data input circuit 11 to a processor 13 sequentially in the order of the time axis-error signal, the tracking error signal, the focusing error signal, the tracking error signal, the time axis error signal, etc. On the other hand, the respective error signals of the rough tuning servo system are fed to the processor 13 with a period several tens of times as long as the sampling period of the error signals of the fine tuning servo system. In other words, the individual error signals of the fine tuning servo system are processed at a frequency several tens times as high as that of the individual error signals of the rough tuning servo system.

The digital error signals outputted sequentially by the data input circuit 11 are fed to the processor 13. In this processor 13, the individual digital error signals are processed or subjected to predetermined equalization processing. The digital error signals thus processed are fed to a data output circuit 14. This data output circuit 14 is constructed, for example, of a D/A converter for converting the individual digital error signals processed into analog error signals and a switching circuit for dividing the individual analog error signals fed serially at the aforementioned sampling timing and distributing them to the controlled portions of the individual servo systems.

The driven portion of the time-axis servo system may, as above, be a CCD or variable delay element inserted into the signal line of the reproduced RF signal, which device has a delay varied in accordance with the signal level of the time-axis error signal. The focusing servo system has as its driven portion a focusing actuator for driving the objective lens forming part of the optical system of the pickup. The tracking servo system has as its driven portion a tracking actuator for pivoting the optical system of the pickup. On the other hand, the spindle servo system has as its controlled portion a spindle motor for driving the disk rotationally, and the slider servo system has as its controlled portion a slider motor for driving the slider in the radial direction of the disk while carrying the pickup.

A controller 15, constructed of a microprocessor, issues a command to the processor 13 to perform predetermined arithmetic processing in response to the error signals of the servo systems corresponding to the respective timing pulses generated by the timing pulse generator 12 such that the individual error signals of the fine tuning servo systems having quicker responses are processed with priority because the responsiveness required of the fine tuning servo systems is higher than required of the rough tuning servo systems. In other words, the priority levels of the fine tuning servo systems are set higher. In accordance with a command from the controller 15, the processor 13 performs equalization or other necessary processing for the servo systems upon each reception of the various digital error signals.

Figure 4:
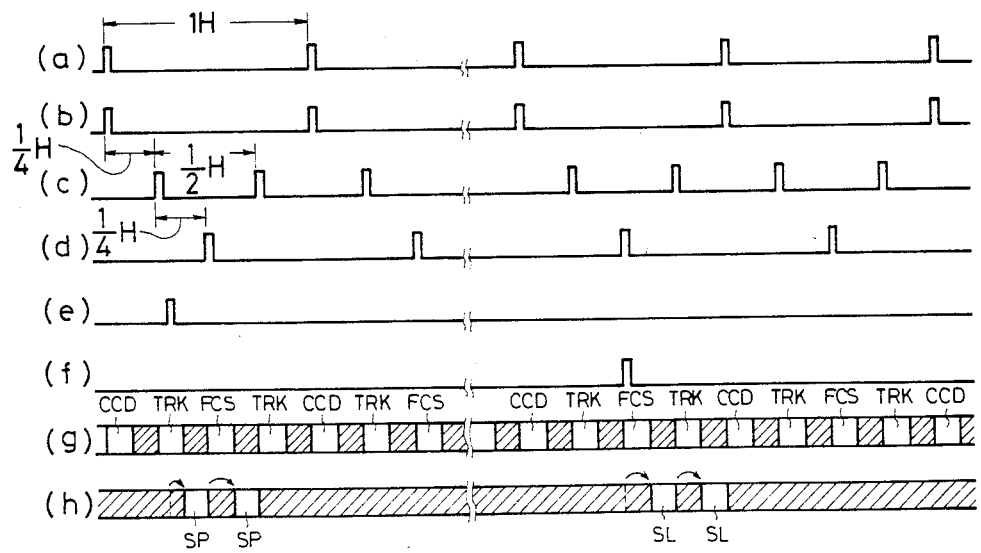
FIG. 4 is a timing chart showing the operation of the circuit of FIG. 1C.

In the structure thus far described, as shown in FIG. 4, the timing pulses of the periods of 1H (b), $\frac{1}{2}$H (c) and 1H (d) having a phase difference of $\frac{1}{2}$H are generated for the individual fine tuning servo systems by the timing generator 12 in synchronism with the reproduced horizontal synchronizing pulses (a). For the rough tuning servo systems, on the other hand, timing pulses (e) and (f) are generated with periods several tens of times as long as those of the fine tuning servo system. As to the fine tuning servo systems, the data input circuit 11 sends the individual analog error signals in a time division manner sequentially in the order of the time-axis error signal, the tracking error signal, the focusing error signal, the tracking error signal, the time axis error signal, etc., to the processor 13 in response to the timing pulses (b) to (d). As a result, for the fine tuning servo system, the processor 13 performs equalization or other required processing sequentially and digitally with the period of $\frac{1}{2}$H, as shown in FIG. 4 at (g). For the rough tuning servo systems, on the contrary, processing is basically performed upon each generation of the timing pulses (e) and (f). The processing for the fine tuning servo systems is performed with priority, as seen in FIG. 4 at (h), because the responsiveness required of the fine tuning servo systems is higher than required of the rough tuning servo systems. In other words, the rough tuning servo systems are processed during intervals when the fine tuning servo systems are not being processed. Moreover, in (g) and (h) in FIG. 4, the hatched positions indicate blank periods, and the remaining portions indicate processing periods of the individual servo systems.

The control for granting priority for the processing for the fine tuning servo systems over the rough tuning servo systems is effected by the controller 15. This control procedure will be described in the following with reference to the flowchart of FIG. 6.

Figure 6:
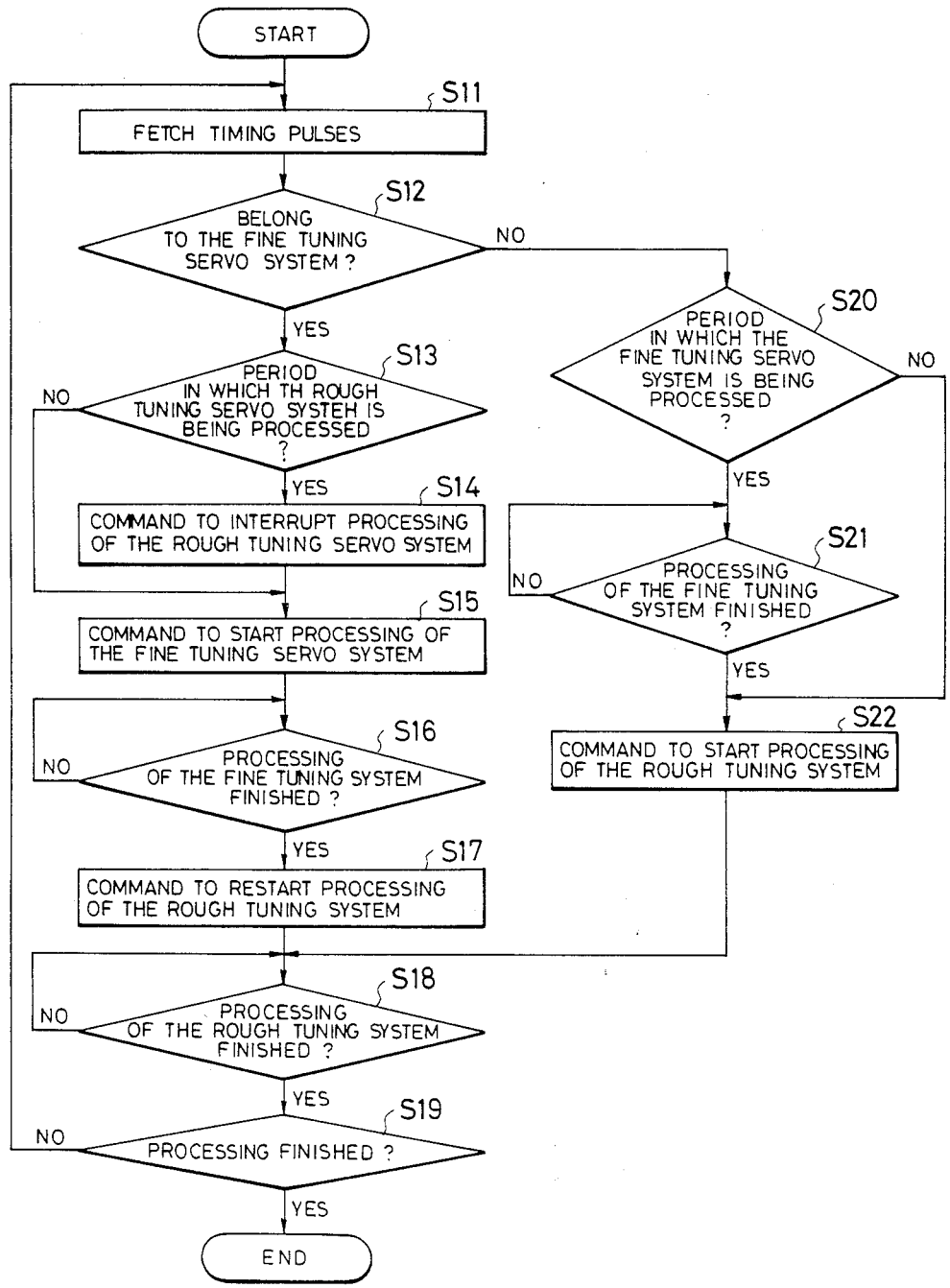
FIG. 6 is a flowchart showing the operating procedures of a controller of FIG. 1C.

In FIG. 6, the timing pulses generated from the timing generator 12 are first fetched (at step S11). It is then judged (at step S12) from the fetched timing pulses whether or not the error signal being sampled belongs to the fine tuning servo systems. If YES, it is further judged (at step S13) whether or not it is now the period in which the rough tuning servo system is being processed. This judgement can be performed under timing management because the time period required for each processing is known in advance. If YES, a command is issued (at step S14) to the processor 13 to interrupt the processing of the rough tuning servo system, and another command is subsequently issued (at step S15) to start the processing for the fine tuning servo system. If NO at step S13, the program transfers step S15.

If it is judged (at step S16) under the timing management, for example, that the processing of the fine tuning servo system has been finished, a command is issued (at step S17) to the processor 13 to restart the interrupted processing of the rough tuning servo system. If it is judged (at step S18) that the processing of the rough tuning servo system has been finished, and if it is judged (at step S19) that no stop command is issued to the system at this time, the program is returned to step S11.

If NO is the result of step S12, it is judged (at step S20) whether or not it is then the period in which the fine tuning servo system is being processed. If YES, finish of the processing of the fine tuning servo system is awaited (at step S21). At the end of the processing of the fine tuning servo system, a command is issued (at step S22) to the processor to start the processing of the rough tuning servo system, and the program then returns to step S18. If NO at step S20, the program transfers to step S22.

By the series of operations described above, the fine tuning servo systems requiring greater responsiveness can be processed with priority.

In the embodiment described above, the two control procedures are divided between the two fine and rough tuning servo systems, and the order of priority is divided into the two stages. However, the control techniques may be divided among three or more systems. For example, the fetches of the ON/OFF command of the servo systems and the operation commands from the keyboard may be controlled at a normal level, whereas the fine and rough tuning servo systems may be controlled with first and second priority levels.

As has been described above, according to the invention, the efficiency can be enhanced because one signal processor can be shared without any deterioration in performance of the controlled portions such as the actuators by using a priority processing technique for the individual servo systems.

What is claimed is:

1. A servo mechanism for a digitally recorded disk reproducing system, said servomechanism including a plurality of servo systems each providing analog error signals, including at least a tracking servo system for providing a tracking error signal and a focusing servo system for providing a focusing error signal, said system further comprising:

switching means receptive of analog error signals of said plurality of servo systems for outputting the same analog error signals sequentially in a time division manner in response to sampling signals of a predetermined frequency;

means for converting the analog error signals passed through said switching means into digital error signals;

arithmetic processing means for subjecting said digital error signals to predetermined processing;

means for reconverting the digital error signals processed by said arithmetic processing means into analog error signals; and means for feeding the reconverted analog signals to respective controlled portions of said various servo systems in synchronism with said sampling signals, wherein the frequency of said sampling period of the tracking error signal is shorter than that of the focusing error signal.

2. A servo mechanism for a digitally recorded disk reproducing system, said servomechanism including a plurality of servo systems each providing analog error signals including at least a focusing servo system for performing a servo focusing operation, said servo mechanism further comprising:

switching means receptive of analog error signals of said plurality of servo systems for outputting the same analog error signals sequentially in a time division manner in response to sampling signals of a predetermined frequency;

means for converting the analog error signals passed through said switching means into digital error signals;

arithmetic processing means for subjecting said digital error signals to predetermined processing;

means for reconverting the digital error signals processed by said arithmetic processing means into analog error signals; and means for feeding the reconverted analog signals to respective controlled portions of said various servo systems in synchronism with said sampling signals; and means for detecting a focused condition of said focusing servo system and generating a lock-in detection signal, wherein during a servo focusing operation of said focusing servo system, arithmetic processing of the error signal of said focusing servo system by said processing means is done with in preference to processing of other error signals until said lock-in detection signal is generated.

3. A servomechanism for a digitally recorded disk reproducing system including a plurality of servo systems each producing analog error signals, said servo systems being divided into at least two priority level types, said servo mechanism comprising:

means receptive of the individual analog error signals of said servo systems for outputting said analog signals as digital error signals sequentially in a time division manner;

arithmetic processing means for subjecting said digital error signals to respective predetermined processing for said servo systems;

means for reconverting the digital error signals processed by said arithmetic processing means into analog error signals and applying the reconverted analog signals to individual controlled elements of corresponding ones of said servo systems; and means for controlling said arithmetic processing means to effect the arithmetic processing of the digital error signals of a predetermined one of said servo system in preference to an error signal from the other of said servo systems in accordance with the respective priority level types.

4. The servo mechanism according to claim 3, wherein one of said servo systems is a fine tuning servo system having a higher priority level and is a rough tuning servo system having a lower priority level.

* * * * *